US 11,218,496 B2

(12) United States Patent
Ragan, III et al.

(10) Patent No.: US 11,218,496 B2
(45) Date of Patent: Jan. 4, 2022

(54) APPLICATION OF COMPUTER VISUAL CLASSIFICATION TO SECURITY EVENTS

(71) Applicant: Bishop Fox, Tempe, AZ (US)

(72) Inventors: Robert Richard Ragan, III, San Francisco, CA (US); Oscar Alejandro Salazar, Alpharetta, GA (US)

(73) Assignee: Bishop Fox, Tempe, AZ (US)

( * ) Notice: Subject to any disclaimer, the term of this patent is extended or adjusted under 35 U.S.C. 154(b) by 0 days.

(21) Appl. No.: 16/752,034

(22) Filed: Jan. 24, 2020

(65) Prior Publication Data
US 2021/0234874 A1 Jul. 29, 2021

(51) Int. Cl.
*H04L 29/06* (2006.01)
*G06N 5/04* (2006.01)
*G06N 20/00* (2019.01)
*H04L 9/06* (2006.01)

(52) U.S. Cl.
CPC ......... *H04L 63/1416* (2013.01); *G06N 5/04* (2013.01); *G06N 20/00* (2019.01); *H04L 9/0643* (2013.01)

(58) Field of Classification Search
CPC ... H04L 63/1416; H04L 9/0643; G06N 20/00; G06N 5/04
See application file for complete search history.

(56) References Cited

U.S. PATENT DOCUMENTS

| 6,631,198 | B1 | | 10/2003 | Hannigan et al. | |
|---|---|---|---|---|---|
| 8,646,072 | B1 | * | 2/2014 | Savant | G06F 21/51 709/229 |
| 9,569,213 | B1 | * | 2/2017 | Brandt | G06Q 10/06 |
| 10,360,668 | B1 | * | 7/2019 | McGregor | G06K 9/6202 |
| 2008/0010683 | A1 | * | 1/2008 | Baddour | G06F 16/951 726/24 |
| 2009/0297050 | A1 | * | 12/2009 | Li | G06K 9/00684 382/225 |
| 2011/0258612 | A1 | * | 10/2011 | Matthiesen | G06F 11/3636 717/128 |
| 2015/0334041 | A1 | * | 11/2015 | Hedbor | H04L 67/42 709/203 |
| 2015/0339829 | A1 | * | 11/2015 | Smarda | H04N 19/126 382/250 |
| 2017/0168656 | A1 | * | 6/2017 | Teachman | G01R 19/2506 |
| 2019/0130192 | A1 | * | 5/2019 | Kauffmann | G06K 9/00765 |
| 2019/0332492 | A1 | * | 10/2019 | Marelas | G06F 11/1453 |
| 2019/0332921 | A1 | * | 10/2019 | Rodriguez | H04L 9/0643 |
| 2020/0051232 | A1 | * | 2/2020 | McGregor | H04L 9/3239 |
| 2020/0073959 | A1 | * | 3/2020 | Tian | G06F 16/137 |

(Continued)

OTHER PUBLICATIONS

Yu-Chuan Su et al., "Scalable Mobile Visual Classification by Kernel Preserving Projection Over High-Dimensional Features," IEEE, Oct. 2014, pp. 1645-1653. (Year: 2014).*

(Continued)

*Primary Examiner* — Luu T Pham
*Assistant Examiner* — Canh Le
(74) *Attorney, Agent, or Firm* — Ramya Possett

(57) ABSTRACT

A security event identification system may enable obtaining, for each of the set of web requests, a screenshot of a corresponding web path resulting from the web request; applying a hash to each obtained screenshot; and determining, based on a comparison of the hashed screenshots, whether a security event exists related to the set of web requests.

15 Claims, 3 Drawing Sheets

(56) References Cited

U.S. PATENT DOCUMENTS

2021/0099484 A1\* 4/2021 Li ..................... G06F 16/2255

OTHER PUBLICATIONS

Valentin Leveau et al., "Recognizing Thousands of Legal Entities through Instance-based Visual Classification," Oct. 25, 2014, pp. 1-5. (Year: 2014).\*

Tsukasa Oi, "ssdeep Project: ssdeep—Fuzzy hashing program," https://ssdeep-project.github.io/ssdeep/index.html.

\* cited by examiner

APPLICATION OF COMPUTER VISUAL CLASSIFICATION TO SECURITY EVENTS

BACKGROUND

The amount of information assets and information available from on the Internet and in an enterprise environment is continually on the rise. Determining security events from web domains services can be incredibly difficult given the sheer size amount of registered web domains (e.g. acme-.com) and associated web paths that exist.

BRIEF DESCRIPTION OF THE DRAWINGS

The following detailed description references the drawings, wherein.

DETAILED DESCRIPTION

Figure 1:
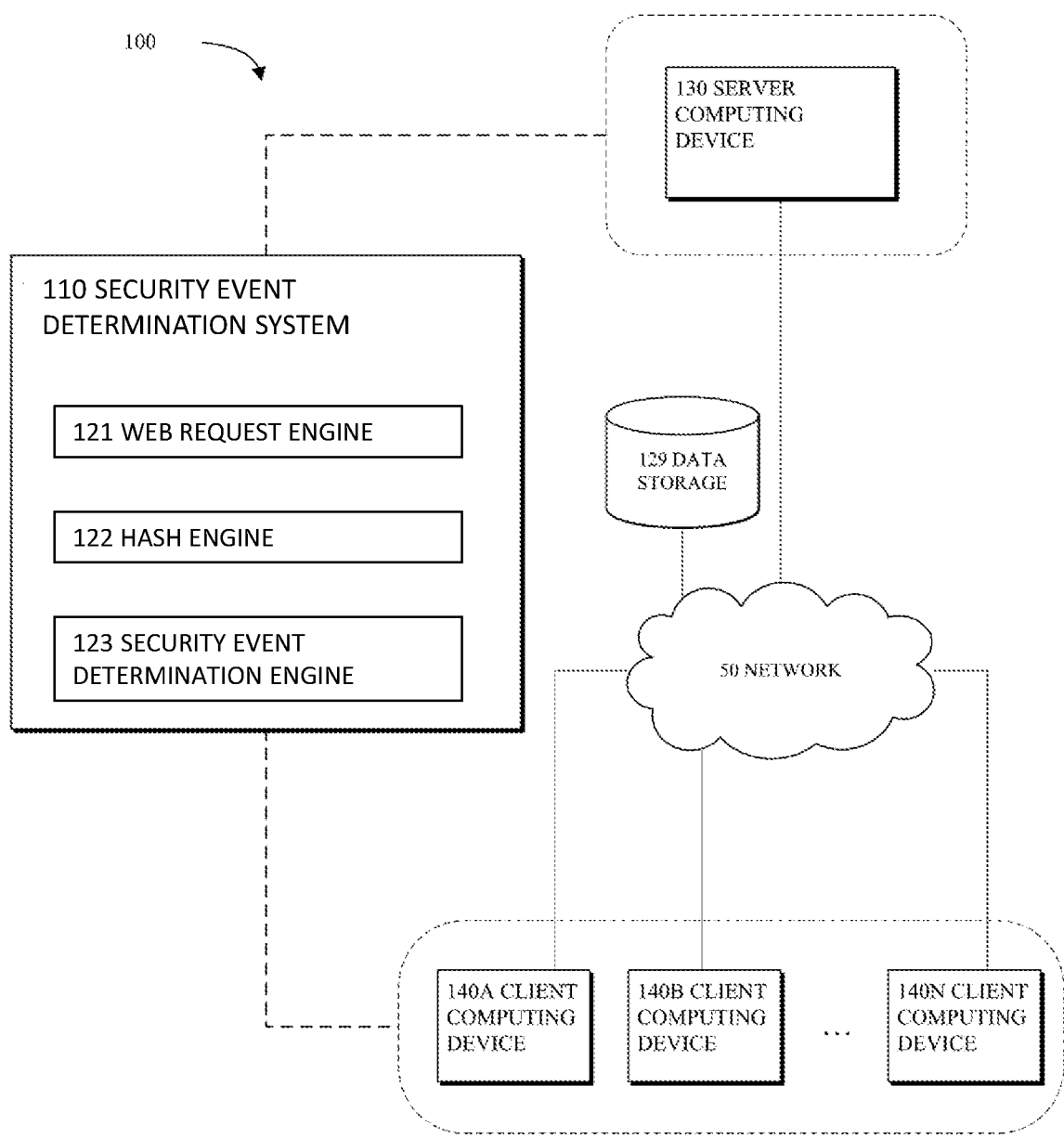
FIG. 1 is a block diagram depicting an example environment in which various examples may be implemented as a security event identification system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The amount of information assets and information available from on the Internet and in an enterprise environment is continually on the rise. Determining security events from web domains services can be incredibly difficult given the sheer size amount of registered web domains (e.g. acme-.com) and associated web paths that exist.

In one example, a security analyst who wishes to discover the content of a set of domains may run numerous scripts to obtain web paths for that set of domains. Running a script, each of which includes one or multiple web requests, returns multiple web paths, e.g., tens or hundreds of web paths. As such, running numerous scripts to obtain web paths for a set of domains could return thousands or hundreds of thousands of web paths to consider. Manually going through the responses of these requests to determine security events is labor-intensive, typically requires predetermined knowledge of what is being looked for, and increases chances of error and inaccuracy. Moreover, attempting to scale this content discovery investigation to dozens or hundreds of domains may be unrealistic and infeasible as well. Further, the extensive time taken to perform this content discovery, compounded with the frequency of changes made to internet content, may cause failure in timely responding to the important security events or make the results of that content discovery even obsolete.

Examples disclosed herein provide technical solutions to these technical challenges by determining security events for a set of domains in an automated way using hashing of screenshots of web paths of that set of domains. The solutions described herein enable an easy and effective organization classification and presentation of a complicated, large set of data screenshots to enable identification of security events associated with a domain target service.

Some examples disclosed herein enable obtaining, for each of the set of web requests, a screenshot of a corresponding web path resulting from the web request; applying a hash to each obtained screenshot; and determining, based on a comparison of the hashed screenshots, whether a security event exists related to the set of web requests.

Some of the examples disclosed herein to identify security events from a set of web requests enable obtaining, for each of the set of web requests, a screenshot of a corresponding web path resulting from the web request; applying a perceptual hash to each obtained screenshot; and determining, based on a comparison of the hashed screenshots, whether a security event exists related to the set of web requests.

Some examples disclosed herein enable instructions to obtain, for each of the set of web requests, a screenshot of the corresponding web response; instructions to apply a hash to each obtained screenshot; instructions to order the obtained screenshots by associated hash value; and instructions to determine, based on a comparison of the hashed screenshots, whether a security event exists related to the set of web responses.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a security event identification system 110. In some examples, environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140. Data store 129 can be any non-transitory machine-readable storage. In some examples, data store 129 can comprise an Solid State Drive (SSD), Hard Disk Drive (HDD), a database, a networked database storage system, a cloud storage, and/or other type of data store that stores information related to security event identification system 110.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

In some examples, security event identification system 110 may include a computing device 131, which may be any type of computing device providing a user interface through which a user can interact with a software application. For example, computing device 131 may include a laptop computing device, a desktop computing device, an all-in-one computing device, a thin client, a workstation, a tablet computing device, a mobile phone, an electronic book reader, a server computing device, a network-enabled appliance such as a "Smart" television, and/or other electronic device suitable for displaying a user interface and processing user interactions with the displayed interface. Computing device 131 may include a physical processor and a data store similar to data store 129.

According to various implementations, security event identification system 110 and the various components described herein may be implemented in hardware and/or a combination of hardware and programming that configures hardware. Furthermore, in FIG. 1 and other Figures described herein, different numbers of components or entities than depicted may be used.

Security event identification system 110 may comprise a web request engine 121, a hash engine 122, a security event determination engine 123, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Web request engine 121 may obtain, for each of a set of web requests, a screenshot of a corresponding web path resulting from the web request. For example, web request engine 121 may receive a set of domains on which content discovery is requested to be performed. In some examples, a "domain" may be a fully qualified domain name ("FQDN"). For example, each of the set of domains may result in a single, unambiguous web path result. In some examples, web request engine 121 may receive the set of domains from a user or set of users from an organization. In other examples, web request engine 121 may receive the set of domains from a data feed made available to the security event identification system 110. In other examples, web request engine 121 may determine the set of domains from a data feed made available to the security event identification system 110. The data feed may include a threat intelligence data feed, a security data feed, an organizational chart of domains related to an organization or set of organizations, a list of domains, and/or other data feed that includes information about a set of domains. In some examples, the set of domains may belong to a same organization or to different organizations.

Web request engine 121 may determine a set of web requests based on the set of domains. In some examples, the web requests may correspond to web paths that are intended to be unique from one another. In some examples, web request engine 121 may receive the set of web requests in addition to or instead of receiving the set of domains. Web request engine 121 may receive the set of web requests in a manner the same as or similar to receiving the set of domains.

Web request engine 121 may run the set of web requests on a browser or other platform that enables the security event identification system 110 to obtain a corresponding web path in response to running a respective web request. For each web request run on the browser (or other platform), web request engine 121 may store data related to the running of the web request, including, but not limited to, the Uniform Resource Locator ("URL") or Uniform Resource Identifier ("URI") of the web request, the web path received in response to running the web request, the intermediate paths taken by the browser (or other platform), a time taken to run the web request, any combination thereof, and/or other data related to running the web request.

The web request engine 121 may generate and/or obtain a screenshot of the web path received in response to running the web request. A "screenshot," as used herein, refers to a digital image that captures contents of a computer display. The data related to running the web request and/or the screenshot of the web path may be stored in data store 129. Web request engine 121 may also store the set of domains, the set of web requests, and/or other data related to obtaining screenshots related to the set of web requests. Web request engine 121 may store the obtained data in data storage 129 and/or update data storage 129 on a regular basis to keep the data up to date.

A "web request," as used herein, may refer to a URL or URI that may be indicative of a web site or domain available on an intranet or internet. A "web path," as used herein, may refer to a web page, remote desktop protocol graphical interface, and/or other type of graphical rendering that is received and displayed via a browser (or other platform capable of displaying graphical renderings of content) in response to inputting a web request into the browser or platform.

Hash engine 122 may apply a hash to each screenshot obtained by web request engine 121. In some examples, hash engine 122 may determine a set of hashes to be applied to the set of screenshots from the web request engine 121. In some examples, hash engine 122 may receive a selection of one or multiple types of hashes to be applied to the set of screenshots, including, but not limited to, perceptual hashes, cryptographic hashes, and/or other types of hashes. Perceptual hashing uses a fuzzy hashing algorithm. Examples of perceptual hashes include perceptual hash, difference hash, average hash, etc. Examples of cryptographic hashes may include MD5 hash, SHA-1 hash, SHA-3 hash, etc. In some examples, the set of hashes to be applied to the set of screenshots may be automatically selected or predetermined. For example, the hash engine 122 may determine a set of hashes to be applied based on the set of domains that were received by web request engine 121, based on the set of web paths obtained by web request engine 121, based on the organization(s) associated with the set of domains, based on preferences of the user of the security event identification system 110 that are stored in the data store 129, based on data from the data store 129, based on any combination thereof, and/or based on other factors related to the usage of the security event identification system 110.

In some examples, responsive to and/or in the process of selecting the set of hashes to be applied, hash engine 122 may also determine a similarity metric for one or multiple hash(es) to be applied. A "similarity metric," as used herein, may indicate a degree of similarity for more than one hashes to be considered visually "similar" to each other. For example, if a difference between two hashes is within a predetermined degree of similarity, the two hashes may be determined to be similar to each other and/or may be grouped together as a single group. The degree of similarity for more than one hashes to be considered "similar" to each other may refer to a predetermined threshold. The degree of similarity may be determined based on user input or system-generated. In some instances, the degree of similarity may be set such that two hashes should be exactly the same to be considered "similar" to each other. The similarity metric may be based on a number of bytes of the resulting hash, a predetermined distance between the hash values, a set of groupings of hash values calculated based on the actual hash values determined for the set of screenshots, and/or other metrics that could be used to determine whether a subset of the hashed values could belong in a grouped subset. The similarity metrics available for a hash may differ based on a type of hash (e.g., perceptual, cryptographic, etc.).

In some examples, the hash engine 122 may select a default similarity metric associated with the hash. In some examples, the hash engine 122 may select a similarity metric associated with the hash based on a type of the hash, a granularity of the screenshot obtained, a stored data value (e.g., stored in data store 129) related to the types of security events to be identified, a stored data value (e.g., stored in data store 129) related to a granularity of results that are expected from the hash, preferences of a user of the security event identification system 110 that are stored in data store, a received value from a user of the security event identification system 100, any combination thereof, or other factors that related to the usage of the security event identification system 110.

Responsive to determining the set of hashes to be applied and/or determining a similarity metric associated with one or multiple of the set of hashes, the hash engine 122 may apply the determined set of hashes to each of the obtained screenshots. The hash engine 122 may store the results of the applied set of hashes to each of the screenshots in the data store 129. In some examples, the hash engine 122 may associate, for each of the determined set of hashes applied, a value of the hash with the corresponding screenshot. The hash engine 122 may store the associated values for each of the screenshots in the data store 129 as well.

Security event determination engine 123 may determine, based on a comparison of the hashed screenshots from hash engine 122, whether a security event exists related to the set of web requests. A "security event," as used herein, may refer to an event that that is worth noting for security assessment or review purposes. For example, a security event may indicate a security vulnerability, a security attack, security exposure, an abnormal behavior, a change in functionality, an outlier from an expected data set, an evaluation of threat intelligence to determine susceptibility, and/or other outlier that is worth noting for security assessment or review purposes. Examples of outliers may include web paths that indicate a resource if not found or an illegitimate response is provided, an indication of misconfiguration, a type of functionality such as a sign-in page, etc. Based on what a particular security event indicates, that security event may be filtered or removed from further security assessment or review or may remain to move forward with further security assessment or review. For example, some security events that have been identified as unimportant (e.g., web paths that indicate a resource is not found or an illegitimate response is provided) may be removed.

In some examples, the security event determination engine 123 may determine whether a security event exists based on the set of hash values corresponding to the set of screenshots associated with the set of web requests. In some examples, the security event determination engine 123 may determine whether a security event exists by ordering the hashed screenshots by corresponding hash value. The security event determination engine 123 may then remove, from the hashed screenshots, a subset of the hashed screenshots that have a similar hashed value. In some examples, the security event determination engine 123 may determine whether a security event exists based on an analysis of the remaining screenshots.

The security event determination engine 123 may determine whether the security event exists by ordering the hashed screenshots by corresponding hash value. As discussed with respect to hash engine 122, the hash engine 122 may apply one or multiple hashes to the screenshots. The security event determination engine 123 may order the hashed screenshots based on one or multiple of the set of hashes used to hash the screenshot, a corresponding set of similarity metrics, and/or associated values for each of the hashes. In some examples, the security event determination engine 123 may group the hashed screenshots into groups based on the similarity metric and set of associated values.

The security event determination engine 123 may remove, from the hashed screenshots, a subset of hashed screenshots that have a similar hashed value. The security event determination engine 123 may determine the subset of hashed screenshots have a similar hash value based on the set of similarity metrics associated with the set of hashes that were applied to the screenshot, based on the the hashed screenshots having exactly the same value, based on the hashed screenshots having a value within a predetermined threshold of each other, based on a user indication that a group of the hashed screenshots have a similar value, and/or based on other indicators.

In some examples, the subset of hashed screenshots and/or the groups of hashed screenshots may be associated with outlier values compared to the screenshots that each have non-similar hash values. In some examples, the security event determination engine 123 may group hashed screenshots of the web paths based on the hashed screenshots having hash values that are statistically outlier values based on the complete set of hashed values of the obtained screenshots.

In some examples, the hashed screenshots that have a similar hashed value may be indicative of screenshots of web paths that indicate a similar response from a web request, like an illegitimate response, an indication that a resource is not found, and/or other type of automatic response that would indicate a non-normal web path response from a web request to a domain.

Figure 2:
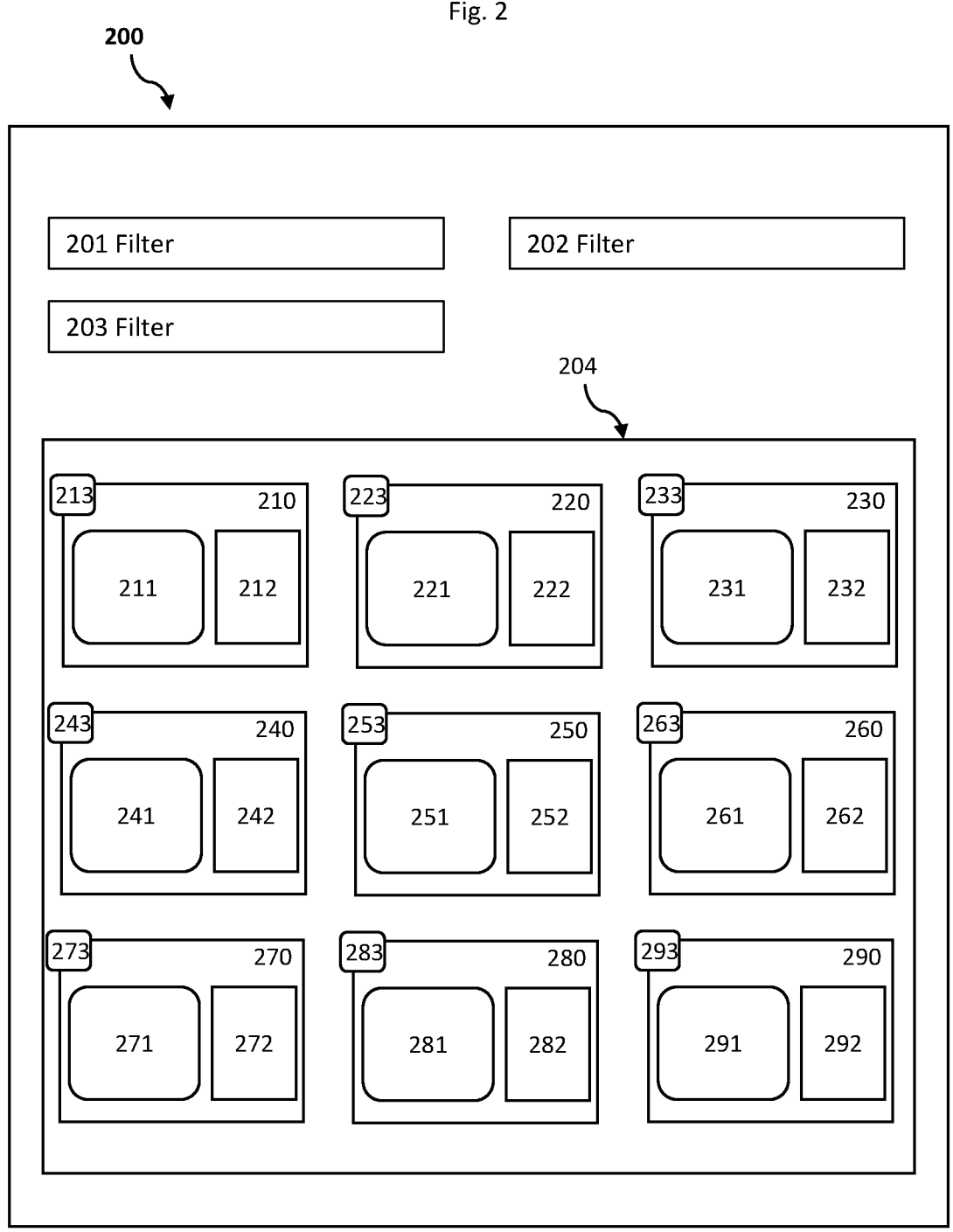
FIG. 2 is a diagram depicting an example user interface for identifying security events.

In some examples, the security event determination engine 123 may provide, for display, the hashed screenshots. For example, as shown in FIG. 2, the security event determination engine 123 provide, for display, the hashed screenshots by showing a visual breakdown of the hashed screenshots. The visual breakdown may comprise a graphical representation of data such as a list, a table, a pie chart, a bar chart, a line chart, a heat map, a histogram, and/or any other types of graphical representations of data. The visual breakdown may also include each of the hashed screenshots or groupings of the hashed screenshots.

In the example illustrated in FIG. 2, a visual breakdown of the hashed screenshots may be displayed in a portion (e.g., item 204) of a user interface (e.g., user interface 200). The visual breakdown may include multiple groups (e.g., groups 210-290) of hashed screenshots. Each group, for example group 210 of FIG. 2, may include: an icon (e.g., icon 213 for group 210) that indicates a number or a count of the screenshots that belong to a same group, a representative screenshot (e.g., screenshot 211) that represents a particular group (e.g., group 210), a URL or a list of URLs (e.g., URL 212) that belong to a same group (e.g., group 210), and/or other information that are useful for security event identification purpose.

The security event determination engine 123 may provide a set of filters (e.g., filters 201-203 in FIG. 2) used to determine the display order of the hashed screenshots, a subset of screenshots to be displayed, and/or other characteristics related to the hashed screenshots displayed. For example, the set of filters may comprise a list of the set of hashes (e.g., perpetual hash, difference hash, average hash, MD5 hash, etc.) used to hash the screenshots, a list of the similarity metrics and corresponding values for the similarity metrics associated with the set of hashes, a granularity used for grouping the hashed screenshots, a set of port numbers associated with the web request and/or other filters. The security event determination engine 123 may display the hashed screenshots in a particular order that is determined based on the selection of filters.

As illustrated in FIG. 2, user interface 200 may include one or more filters (e.g., filters 201, 202, and 203). Filter 201 may allow a user to select a particular group type (e.g., perceptual hash, difference hash, average hash, MD5 hash, etc.), whose selected value is used to group the screenshots to be displayed in user interface 200. For example, if the average hash is selected in filter 201, the screenshots would be hashed in average hash and/or grouped based on the results. In some examples, filter 202 may allow a user to select a sort type that indicates how the screenshots should be sorted by. For example, if a sort type of difference hash is selected for filter 202, individual screenshots and/or grouped subsets of screenshots would be sorted based on difference hash value associated with the screenshots. Filter 203 may allow a user to select to list all screenshots (e.g., List All) or show the screenshots in groups (e.g., Visual Similarity) determined by similarity, in part also based on other filters such as filter 201 and filter 202. The various combinations of filters and values available for each filter are not limited to the examples described herein.

In some examples, filters 201 and 202 may be used in combination to group and sort the hashed screenshots and gain various insights from the hashed screenshot data set. For example, if a filter 201 of MD5 hash is selected and a filter 202 of difference hash is selected, this may provide, via the user interface 200, a thorough view of the attack surface while having exact duplicate screenshots removed from the set of screenshots displayed on the user interface. An attack surface of the set of domains may comprise, for example, a complete set of web paths and/or responses to requests made to the set of domains. With these two filter selections, the screenshots displayed via the user interface 200 will be next to similar looking images, sorted in an order from most simple to most complex screenshots (e.g., from an API page to a home page).

In another example in which a filter 201 of difference hash is selected and a filter 202 of bucket size is selected, the user interface 200 may provide for display the most commonly obtained screenshots first and the outlier screenshots and/or automated non-response screenshots at the end. In this example, the non-visually sorted screenshots may not look similar to their neighbors on the user interface 200.

In another example in which a filter 201 of average hash is selected and a filter 202 of difference hash is selected, the screenshots may be provided for display on the user interface from a list of smallest to largest groups. This may enable, via user interface 200, a quick view in the types of web paths and applications obtained from the set of domains and also enable quick review of an attack surface of an organization.

In some of these examples, as shown in FIG. 2, the security event determination engine 123 may group multiple subsets of the hashed screenshots based on the corresponding hash value of the hash screenshots, a selected set of similarity metrics, a selected or default granularity, and/or any combination thereof. In some examples, the security event determination engine 123 may group the hashed screenshots in a manner similar to determining whether the hashed screenshots have similar values, as mentioned above.

The security event determination engine 123 may provide for display, for each of the grouped subsets of the hashed screenshots, a representative screenshot (e.g., screenshot 211 that represents a grouped subset 210 in FIG. 2). In some examples, along with displaying the ordered hashed screenshots and/or groups of hashed screenshots, the security event determination engine 123 may also display the corresponding hash value or set of values associated with the grouped hashed screenshots.

The security event determination engine 123 may allow for selection of one or more of the hashed screenshots or groups of hashed screenshots to be removed from the set of hashed screenshots. In some examples, the security event determination engine 123 may recommend selection of one or more of the hashed screenshots or groups of screenshots for removal. The security event determination engine 123 may recommend for selection a subset of hashed screenshots or groups of hashed screenshots that have similar values that may be indicative of automated responses to a web request, such as an illegitimate response, an indication that a resource is not found, and/or other types of automatic responses to a web request that indicate a non-normal response for the web request. The security event determination engine 123 may remove the selected hashed screenshots or groups of screenshots responsive to receiving a selection from a user of the security event identification system 110.

The security event determination engine 123 may enable tagging of the hashed screenshots or groups of screenshots. In some examples, the security event determination engine 123 may enable tagging of the hashed screenshots or groups of screenshots with a predetermined set of tags. The predetermined set of tags may be an asset inventory taxonomy, a set of tags provided by a user of the security event identification system 110, a set of tags stored in the data store 129, a set of tags associated with the set of domains, a set of tags associated with an organization or set of organizations, a set of tags machine learned based on the web paths associated with the hashed screenshots, and/or other types of tags. The predetermined set of tags may include, for example, tags related to a login page, a 404 page, a home page, an indication of a misconfiguration, a registration page, a sign-in page, an indication of a particular type of asset like a Virtual Private Network ("VPN") endpoint, a remote access solution, a web appliance, a user interface, and/or other type of asset.

In some examples, the predetermined set of tags may include a customer facing tag, an internal use tag, an error tag, and/or other tags. In some of these examples, the predetermined set of tags (like the customer facing tag, internal use tag, error tag, etc.) may each be associated with a set of sub-tags. In these examples, the security event determination engine 123 may associate some or all of the hashed screenshots or groups of hashed screenshots with a tag and set of sub-tags. In some examples, a hashed value may be mapped to a tag and/or sub-tag. In some of these examples, the mapping of the hashed value may persist across screenshots from different organizations and domains.

The security event determination engine 123 may store the associated tags, sub-tags, and/or any combination thereof with the information related to the corresponding hashed screenshot in the data store 129.

The security event determination engine 123 may then provide for display, for download, and/or other type of access, the remaining hashed screenshots, their associated web requests and web paths, the tagged hashed screenshots, and/or other information related to the remaining hashed screenshots. By enabling removal of the hashed screenshots related to the non-normal, automated responses from some of the web requests obtained from the web request engine 121, the security event determination engine 123 may enable determination of whether a further security event exists related to the web requests that correspond to working or expected web paths of the set of domains. The security event identification system 110 significantly reduces the amount of time spent by a security analyst to look through the responses to the set of web domains, by a factor of 10-100, or more, and enables scaling of the determination of security events from sets of domains through this reduction in analysis time.

In some examples, the security event identification system 110, including the web request engine 121, the hash engine 122, the security event determination engine 123, and/or other engines, may run at predetermined or regular intervals to obtain screenshots of web paths for a same set of domains, hash the obtained screenshots, and analyze the hashed screenshots. In these examples, the security event determination engine 123 may compare the hashed screenshots from multiple runs across time of the security event identification system 110 for a same set of domains to determine if differences between the hashed screenshots that correspond to the set of domains exists. The security event determination engine 123 may determine a difference between the hashed screenshots based on a statistically significant difference in hash values, a similarity metric associated with one or more of the hashes applied by the security event identification system 110, based on user input to the security event identification system 110, and/or based on other factors.

In some examples, the security event determination engine 123 may use machine learning to determine how to group the set of hashed screenshots into subset of hashed screenshots. The security event determination engine 123 may use or generate a machine-learning model that may use any machine-learning algorithm that finds patterns in training data and/or predicts an output. The security event determination engine 123 may train the machine-learning model using training data that may include, for example, the sets of hashed screenshots from multiple sets of web requests and the resulting groups of hashed screenshots, and/or other data that could help train the model. In some examples, the security event determination engine 123 may obtain multiple subsets of the hashed screenshots, that are related to multiple sets of web requests, and that have been grouped based on corresponding hash value of the hashed screen shots. The security event determination engine 123 may train a machine-learning model with the multiple subsets and use the machine learning model to recommend grouped subsets of hashed screenshots that indicate automated non-normal responses to web requests, that indicate a security vulnerability, a security attack, and/or other security event.

In some examples, the security event determination engine 123 may use machine learning to tag the hashed screenshots with tags and/or sub-tags. The security event determination engine 123 may use obtained tagged screenshots as training data for the corresponding machine learning model.

In some examples, the security event determination engine 123 may use machine learning to determine if differences exist across time for a set of domains run through the security event identification system 100. In these examples, the security event determination engine 123 may use data related to the running of the security event identification system 110 at predetermined or regular intervals.

In performing their respective functions, engines 121-123 may access data storage 129 and/or other suitable database (s). Data storage 129 may represent any memory accessible to security event identification system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. security event identification system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

FIG. 2 is a diagram depicting an example user interface 200 for identifying security events. FIG. 2 is described herein with respect to FIG. 1.

Figure 3:
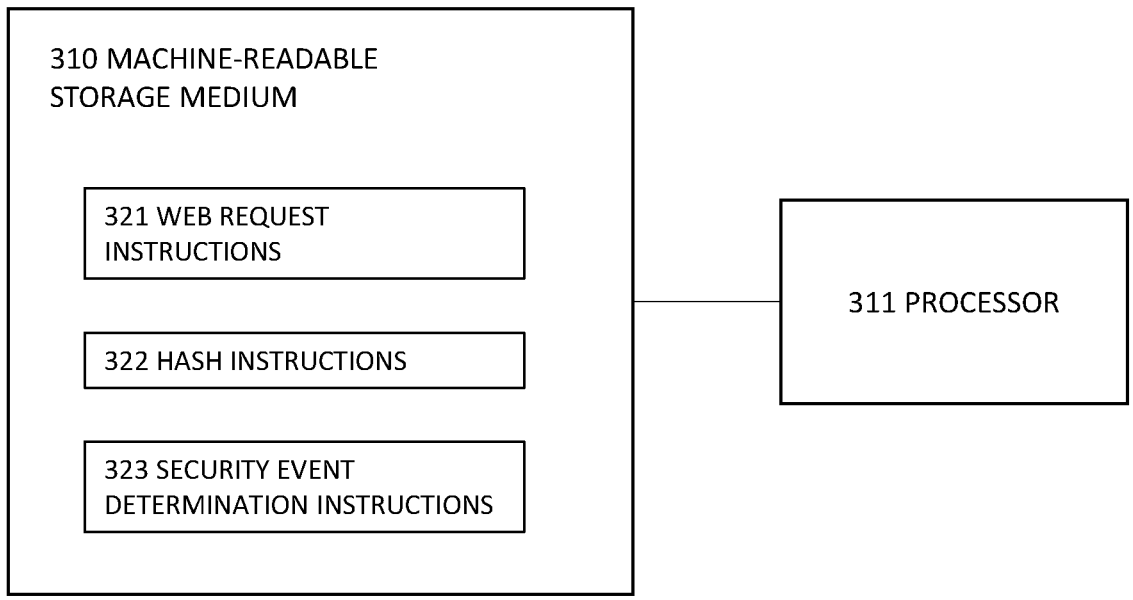
FIG. 3 is a block diagram depicting an example machine-readable storage medium comprising instructions executable by a processor for identifying security events.

FIG. 3 is a block diagram depicting an example machine-readable storage medium 310 comprising instructions executable by a processor for identifying security events.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements security event identification system 110 of FIG. 1.

In FIG. 3, the executable program instructions in machine-readable storage medium 310 are depicted as web request instructions 321, hash instructions 322, and security event identification instructions 323. Instructions 321-323 represent program instructions that, when executed, cause processor 311 to implement engines 121-123, respectively.

Machine-readable storage medium 310 may be any electronic, magnetic, optical, or other physical storage device that contains or stores executable instructions. In some implementations, machine-readable storage medium 310 may be a non-transitory storage medium, where the term "non-transitory" does not encompass transitory propagating signals. Machine-readable storage medium 310 may be implemented in a single device or distributed across devices. Likewise, processor 311 may represent any number of processors capable of executing instructions stored by machine-readable storage medium 310. Processor 311 may be integrated in a single device or distributed across devices. Further, machine-readable storage medium 310 may be fully or partially integrated in the same device as processor 311, or it may be separate but accessible to that device and processor 311.

In one example, the program instructions may be part of an installation package that when installed can be executed by processor 311 to implement security event identification system 110. In this case, machine-readable storage medium 310 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Figure 4:
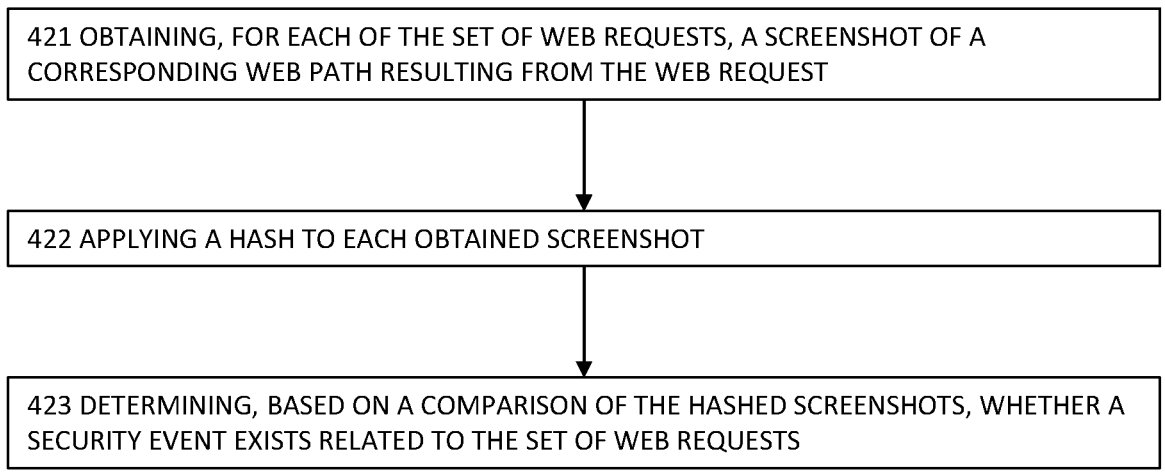
FIG. 4 is a flow diagram depicting an example method for identifying security events.

FIG. 4 is a flow diagram depicting an example method 300 for identifying security events. The various processing blocks and/or data flows depicted in FIG. 4 (and in the other drawing figures described herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant to be an example and, as such, should not be viewed as limiting. Method 400 may be implemented in the form of executable instructions stored on a machine-readable storage medium, such as storage medium 210, and/or in the form of electronic circuitry.

In block 421, method 400 may include obtaining, for each of the set of web requests, a screenshot of a corresponding web path resulting from the web request. Referring to FIG. 1, web request engine 121 may be responsible for implementing block 421.

In block 422, method 400 may include applying a hash to each obtained screenshot. Referring to FIG. 1, hash engine 122 may be responsible for implementing block 422.

In block 423, method 400 may include determining, based on a comparison of the hashed screenshots, whether a security event exists related to the set of web requests. Referring to FIG. 1, security identification engine 123 may be responsible for implementing block 423.

The foregoing disclosure describes a number of example implementations for identifying security events. The disclosed examples may include systems, devices, computer-readable storage media, and methods for identifying security events. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method for identifying security events from a set of web requests, the method comprising:
obtaining, for each individual web request of the set of web requests, a screenshot of a corresponding web path resulting from the individual web request;
applying a perceptual hash to each obtained screenshot to generate a set of hashed screenshots;
associating a value of the perceptual hash with the corresponding obtained screenshot;
applying a cryptographic hash to each of the obtained screenshots;
associating a value of the cryptographic hash with the corresponding obtained screenshot;
grouping the set of hashed screenshots into multiple grouped sets of hashed screenshots based on corresponding hash value of the set of hashed screenshots, the multiple grouped set of hashed screenshots including a first grouped set of hashed screenshots having a value within a first predetermined threshold of each other and a second grouped set of hashed screenshots having a value within a second predetermined threshold of each other;

comparing a first screenshot of the set of hashed screenshots with the first grouped set of hashed screenshots and the second grouped set of hashed screenshots; and
determining whether a security event exists based on the comparison of the first screenshot and based on a set of values of the perceptual hash associated with the set of web requests and a set of values of the cryptographic hash associated with the set of web requests;
ordering the set of hashed screenshots by hash value;
removing, from the set of hashed screenshots, a subset of the hashed screenshots that have a similar hashed value;
wherein determining whether the security event exists comprises: recommending, based on a similarity metric applied to the corresponding subset of the set of hashed screenshots, removal of the first screenshot of a corresponding first web path resulting from a first web request of the set of web requests, the first screenshot comprising an automated response to the first web request that indicates a non-normal response for the first web request, the non-normal response comprising a response that indicates a resource is not found or an illegitimate response is provided; and
wherein removing the subset of the hashed screenshots comprises: removing the first screenshot to the corresponding first web path.

2. The method of claim 1, wherein applying the perceptual hash further comprises:
selecting a similarity metric for the perceptual hash, wherein the similarity metric is measured based on a number of bytes of the resulting hash.

3. The method of claim 1, further comprising:
providing for display the set of hashed screenshots, ordered by corresponding hash value.

4. The method of claim 3, wherein grouping further comprises:
grouping multiple subsets of the set of hashed screenshots based on corresponding hash value of the set of hashed screenshots; and
wherein providing for display further comprises:
providing for display a representative screenshot for each of the multiple grouped sets of screenshots.

5. The method of claim 1, wherein the set of the web requests belong to domains owned by different organizations.

6. The method of claim 1,
wherein grouping further comprises:
grouping multiple subsets of the hashed screenshots based on corresponding hash value of the set of hashed screenshots; and
wherein determining further comprises:
training a machine-learning model with the multiple grouped sets of screenshots; and
using the machine-learning model for the determination.

7. A non-transitory machine-readable storage medium comprising instructions executable by a hardware processor of a computing device for identifying security events from a set of web pages, the machine-readable storage medium comprising:
instructions to obtain, for each individual web request of the set of web requests, a screenshot of the corresponding web path resulting from the individual web request;
instructions to apply a perceptual hash to each obtained screenshot to generate a set of hashed screenshots;
instructions to associate a value of the perceptual hash with the corresponding obtained screenshot;
instructions to apply a cryptographic hash to each of the obtained screenshots;
instructions to associate a value of the cryptographic hash with the corresponding obtained screenshot;
instructions to group the set of hashed screenshots into multiple grouped sets of hashed screenshots based on corresponding hash value of the set of hashed screenshots, the multiple grouped set of hashed screenshots including a first grouped set of hashed screenshots having a value within a first predetermined threshold of each other and a second grouped set of hashed screenshots having a value within a second predetermined threshold of each other;
instructions to compare a first screenshot of the set of hashed screenshots with the first grouped set of hashed screenshots and the second grouped set of hashed screenshots;
instructions to determine whether a security event exists based on the comparison of the first screenshot and based on a set of values of the perceptual hash associated with the set of web requests and a set of values of the cryptographic hash associated with the set of web requests;
instructions to order the set of hashed screenshots by hash value;
instructions to remove, from the set of hashed screenshots, a subset of the hashed screenshots that have a similar hashed value;
wherein determining whether the security event exists comprises: recommending, based on a similarity metric applied to the corresponding subset of the set of hashed screenshots, removal of the first screenshot of a corresponding first web path resulting from a first web request of the set of web requests, the first screenshot comprising an automated response to the first web request that indicates a non-normal response for the first web request, the non-normal response comprising a response that indicates a resource is not found or an illegitimate response is provided; and
wherein removing the subset of the hashed screenshots comprises: removing the first screenshot to the corresponding first web path.

8. The non-transitory machine-readable storage medium of claim 7, wherein the instructions to apply the hash comprise:
instructions to select one or multiple types of hashes to be applied to the set of screenshots, wherein the types of hashes include: a perceptual hash; or a cryptographic hash;
instructions to select, for each hash to be applied to the set of screenshots, a similarity metric;
instructions to apply, for each hash to be applied, the corresponding hash with the similarity metric to each of the obtained screenshots.

9. The non-transitory machine-readable storage medium of claim 7,
wherein the instructions to group further comprise:
instructions to group multiple subsets of the set of hashed screenshots based on corresponding hash value of the screenshots; and
instructions to provide for display a representative screenshot for each of the multiple grouped sets of screenshots.

10. A system for identifying security events from a set of web requests, the system comprising a hardware processor implementing machine-readable instructions that cause the system to:

obtain, for each individual web request of the set of web requests, a screenshot of a corresponding web path resulting from the individual web request;
apply a perceptual hash to each obtained screenshot to generate a set of hashed screenshots;
associate a value of the perceptual hash with the corresponding obtained screenshot;
apply a cryptographic hash to each of the obtained screenshots;
associate a value of the cryptographic hash with the corresponding obtained screenshot;
group the set of hashed screenshots into multiple grouped sets of hashed screenshots based on corresponding hash value of the set of hashed screenshots, the multiple grouped set of hashed screenshots including a first grouped set of hashed screenshots having a value within a first predetermined threshold of each other and a second grouped set of hashed screenshots having a value within a second predetermined threshold of each other;
compare a first screenshot of the set of hashed screenshots with the first grouped set of hashed screenshots and the second grouped set of hashed screenshots
determine whether a security event exists based on the comparison of the first screenshot and based on a set of values of the perceptual hash associated with the set of web requests and a set of values of the cryptographic hash associated with the set of web requests;
order the set of hashed screenshots by hash value;
remove, from the set of hashed screenshots, a subset of the hashed screenshots that have a similar hashed value;
wherein determining whether the security event exists comprises: recommending, based on a similarity metric applied to the corresponding subset of the set of hashed screenshots, removal of the first screenshot of a corresponding first web path resulting from a first web request of the set of web requests, the first screenshot comprising an automated response to the first web request that indicates a non-normal response for the first web request, the non-normal response comprising a response that indicates a resource is not found or an illegitimate response is provided; and
wherein removing the subset of the hashed screenshots comprises: removing the first screenshot to the corresponding first web path.

11. The system of claim 10, wherein applying the perceptual hash further comprises:
selecting a similarity metric for the perceptual hash, wherein the similarity metric is measured based on a number of bytes of the resulting hash.

12. The system of claim 10, further comprising:
providing for display the set of hashed screenshots, ordered by corresponding hash value.

13. The system of claim 12, wherein grouping further comprises:
grouping multiple subsets of the set of hashed screenshots based on corresponding hash value of the set of hashed screenshots; and
wherein providing for display further comprises:
providing for display a representative screenshot for each of the multiple grouped sets of screenshots.

14. The system of claim 10, wherein the set of the web requests belong to domains owned by different organizations.

15. The system of claim 10,
wherein grouping further comprises:
grouping multiple subsets of the hashed screenshots based on corresponding hash value of the set of hashed screenshots; and
wherein determining further comprises:
training a machine-learning model with the multiple grouped sets of screenshots; and
using the machine-learning model for the determination.

* * * * *